US012085264B1

(12) United States Patent
Wong

(10) Patent No.: US 12,085,264 B1
(45) Date of Patent: Sep. 10, 2024

(54) PORTABLE MAGNETIC LIGHTING FIXTURE

(71) Applicant: QUANTUM LIGHTING PRODUCTS LIMITED, Hong Kong (CN)

(72) Inventor: Chihim Wong, Hong Kong (CN)

(73) Assignee: QUANTUM LIGHTING PRODUCTS LIMITED, Hong Kong (CN)

( * ) Notice: Subject to any disclaimer, the term of this patent is extended or adjusted under 35 U.S.C. 154(b) by 0 days.

(21) Appl. No.: 18/607,787

(22) Filed: Mar. 18, 2024

(30) Foreign Application Priority Data

Jan. 12, 2024 (CN) ......................... 202410050632.2

(51) Int. Cl.

| | |
|---|---|
| ***F21V 21/14*** | (2006.01) |
| ***F21L 4/04*** | (2006.01) |
| ***F21L 4/08*** | (2006.01) |
| ***F21V 21/06*** | (2006.01) |
| ***F21V 29/70*** | (2015.01) |
| ***F21Y 115/10*** | (2016.01) |

(52) U.S. Cl.

CPC ............ *F21V 21/145* (2013.01); *F21L 4/045* (2013.01); *F21L 4/085* (2013.01); *F21V 21/06* (2013.01); *F21V 29/70* (2015.01); *F21Y 2115/10* (2016.08)

(58) Field of Classification Search

CPC ...... F21V 21/06; F21V 21/096; F21V 21/145; F21V 21/26; F21V 21/28; F21V 21/29; F21V 29/70; F21L 4/045; F21L 4/085; F21Y 2115/10

See application file for complete search history.

(56) References Cited

U.S. PATENT DOCUMENTS

| | | | | |
|---|---|---|---|---|
| 5,422,802 A * | 6/1995 | Lin | ......................... | F21V 21/26 362/427 |
| 9,121,591 B2 | 9/2015 | Chiang | | |
| 10,928,040 B2 | 2/2021 | Yeh | | |

FOREIGN PATENT DOCUMENTS

| | | |
|---|---|---|
| CN | 116592314 A * | 8/2023 |

* cited by examiner

*Primary Examiner* — Thomas M Sember

(74) *Attorney, Agent, or Firm* — Jeenam Park

(57) ABSTRACT

The present disclosure discloses a portable magnetic lighting fixture having a housing, a light source component configured for emitting light, accommodated within the housing, a supporting base configured for supporting the housing, and a magnetic adjustment component having a first magnetic member and a second magnetic member for magnetically coupling with the first magnetic member on the housing for controlling the angular adjustment of the housing. The coordination of the first and second magnetic members enables relative rotation as the housing and supporting base rotate. The magnetic force between the first and second magnetic members allows for stable adjustment to any angle without the need for toothed engagement. The absence of collisions during the relative movement of the first and second magnetic members reduces noise generated during rotation.

14 Claims, 7 Drawing Sheets

PORTABLE MAGNETIC LIGHTING FIXTURE

CROSS-REFERENCE TO RELATED APPLICATIONS

The present disclosure claims priority to Chinese Patent Application No. 202410050632.2 filed on Jan. 12, 2024, the content of which is incorporated herein by reference in its entirety.

TECHNICAL FIELD

The present disclosure relates to the field of lighting technology, and in particular to a small and portable magnetic lighting fixture.

BACKGROUND

There exists a portable lighting device, such as a headlamp that is installed in a head position. During use, it is usually necessary to adjust the angle of the lamp head to control the direction of light irradiation. In this portable magnetic lighting fixture, the angle of the lamp head is stabilized after rotation of the lamp head by means of a tooth cam and a tooth groove between the lamp head and the supporting base i.e. forehead plate. In the process of adjusting the lamp head, the tooth cam and tooth groove rotate relative to each other and collide with each other close to or far away from each other, which make a large sound, cause large wear and tear, and due to the large width of the tooth cam, the precision of the angle adjustment is limited.

Therefore, it is necessary to provide a lighting fixture for solving the issues.

SUMMARY

In view of this, the present disclosure is designed to provide a portable magnetic lighting fixture to improve a technical problem in the prior art in which a large noise is emitted during the adjustment of the lamp head.

The present disclosure discloses a portable magnetic lighting fixture comprising a housing, a light source component configured for emitting light, accommodated within the housing, a supporting base configured for supporting the housing, and a magnetic adjustment component having a first magnetic member and a second magnetic member for magnetically coupling with the first magnetic member on the housing for controlling the angular adjustment of the housing. The coordination of the first and second magnetic members enables relative rotation as the housing and supporting base rotate. The magnetic force between the first and second magnetic members allows for stable adjustment to any angle without the need for toothed engagement. The absence of collisions during the relative movement of the first and second magnetic members reduces noise generated during rotation.

BRIEF DESCRIPTION OF DRAWINGS

Many aspects of the embodiments may be better understood with reference to the following drawings. The components in the drawings are not necessarily drawn to scale, the emphasis instead being placed upon clearly illustrating the principles of the embodiment.

DESCRIPTION OF EMBODIMENTS

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

It should be noted that when a component is considered to be "connected" to another component, it may be directly connected to another component or a central component may be present between two components at the same time. When a component is considered to be "provided" another component, it may be arranged directly on another component or possibly with a centered component.

Unless otherwise defined, all technical and scientific terms used herein have the same meaning, which is used in the description of the present disclosure to describe specific embodiments and is not intended to limit the disclosure. The term "or/and" used here includes any and all combinations of one or more of the associated listed items.

It will be appreciated that the term "fixed to" or "set on" another component implies direct or indirect placement on that component. When a component is referred to as "connected to" another, it may be directly or indirectly linked. The terms such as "length," "width," "up," "down," "front," "back," "left," "right," "vertical," "horizontal," "top," "bottom," "inner," "outer," etc., indicate orientation or positional relationships based on the illustrated figures for ease of description, not implying specific orientations, constructions, or operations, and should not be seen as limitations to this application.

Furthermore, terms like "first" and "second" are used for descriptive purposes only and do not imply relative importance or a specific quantity of indicated technical features. Features designated with "first" and "second" may include one or more instances. In this embodiment, the portable magnetic lighting fixture may be, but not limited to, a headlamp, flashlight, work light, etc.

Figure 1:
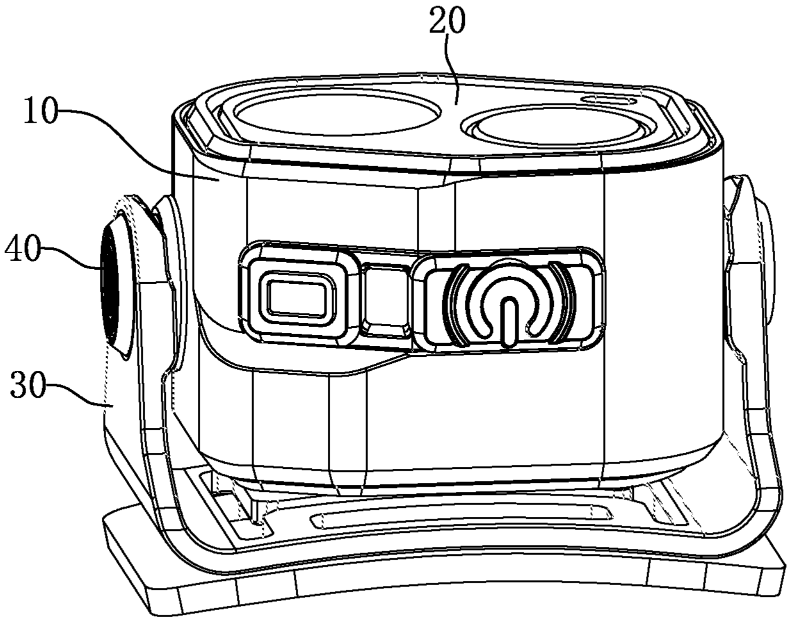
FIG. 1 is an isometric view of an portable magnetic lighting fixture in accordance with an exemplary embodiment of the present disclosure.
Figure 2:
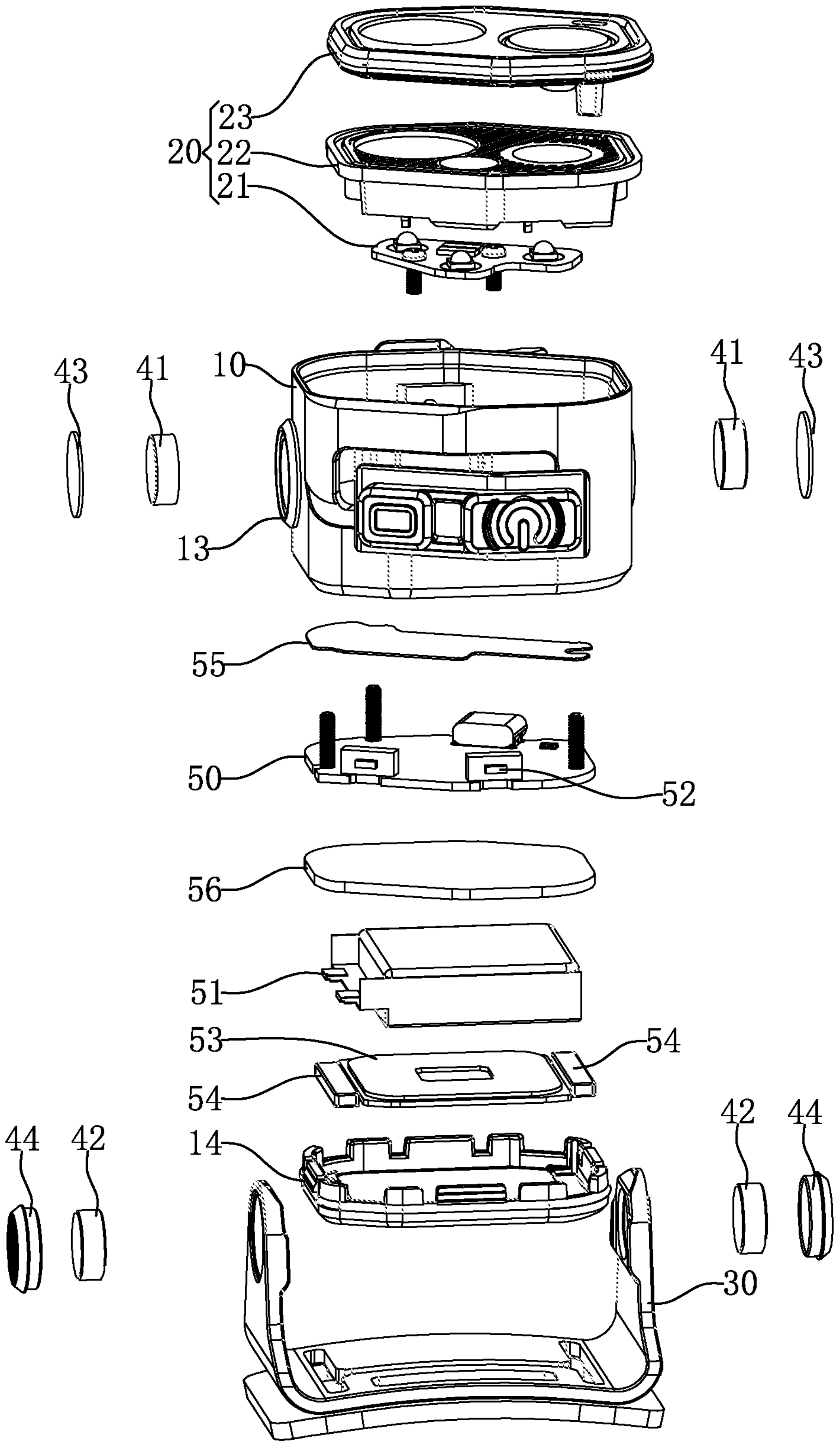
FIG. 2 is an isometric exploded view of the portable magnetic lighting fixture in FIG. 1.
Figure 3:
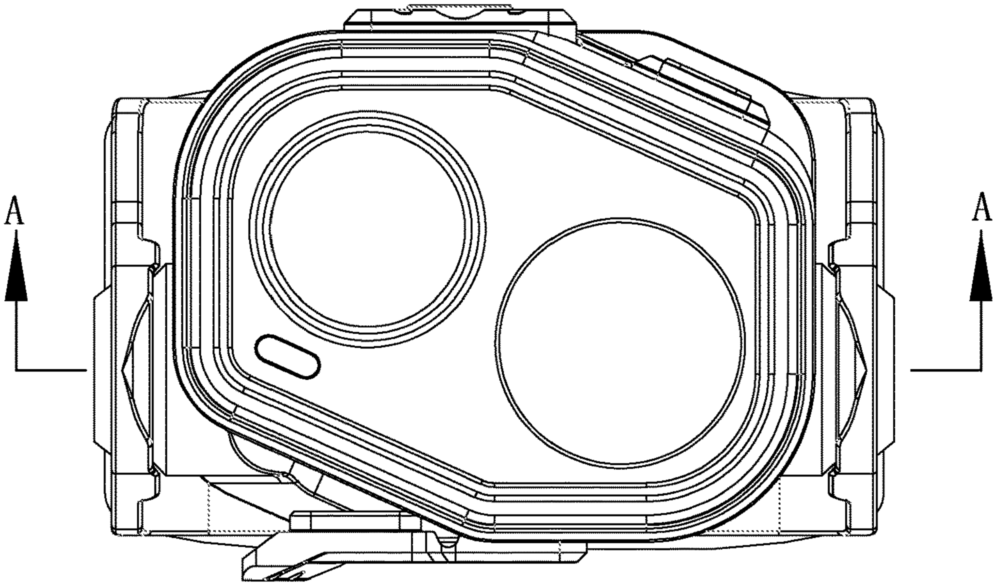
FIG. 3 is an isometric view of the portable magnetic lighting fixture in FIG. 1, viewed from another aspect.
Figure 4:
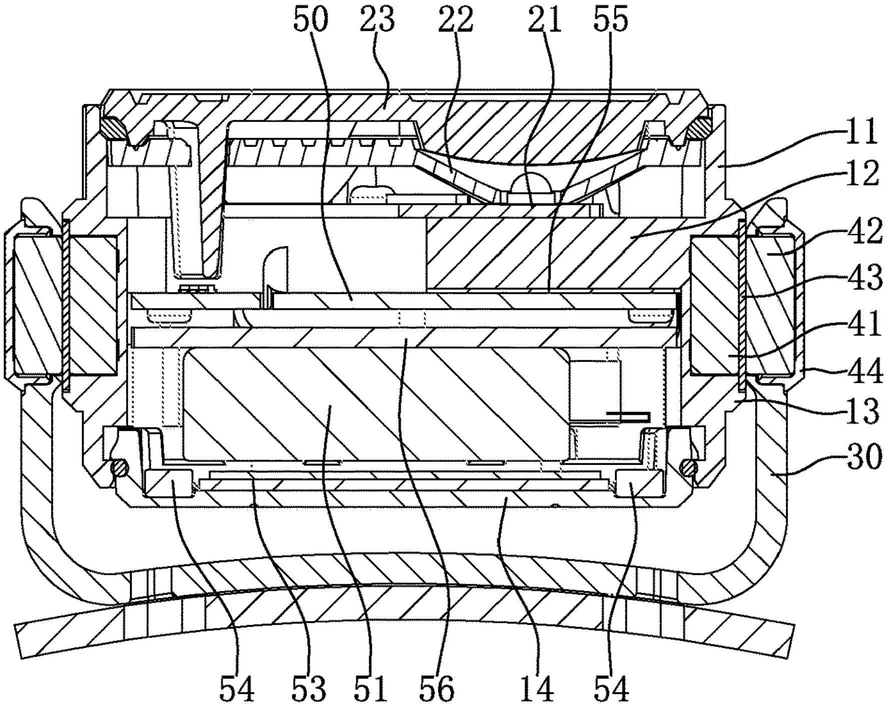
FIG. 4 is a cross-sectional view of the portable magnetic lighting fixture along line A-A in FIG. 1.
Figure 5:
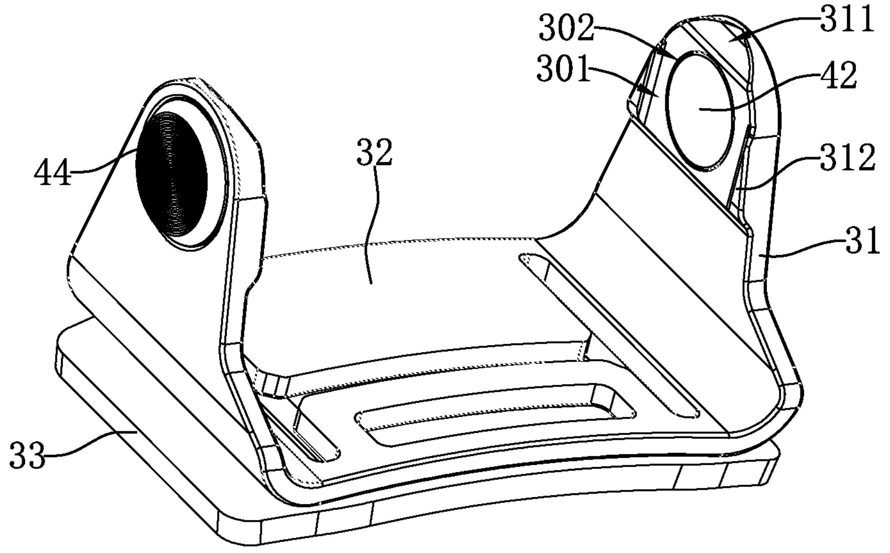
FIG. 5 is an isometric view of an supporting base of the portable magnetic lighting fixture in FIG. 2.
Figure 6:
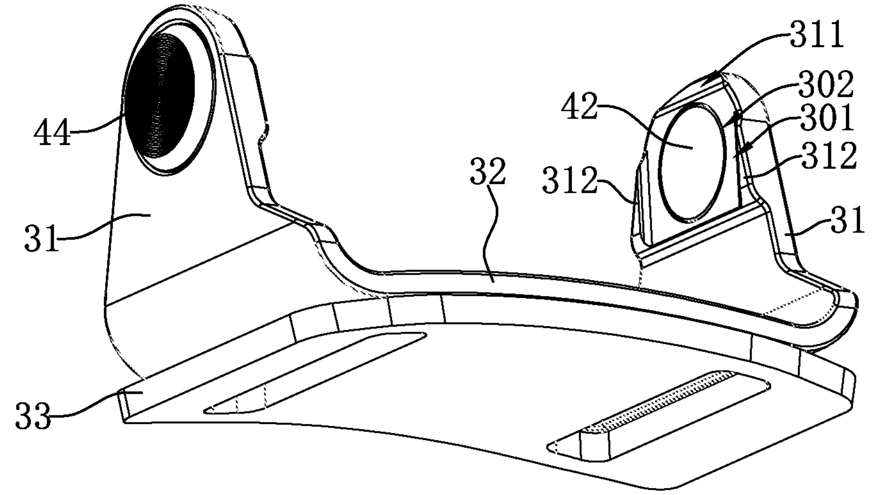
FIG. 6 is an isometric view of an supporting base of the portable magnetic lighting fixture in FIG. 5, viewed from another aspect.
Figure 7:
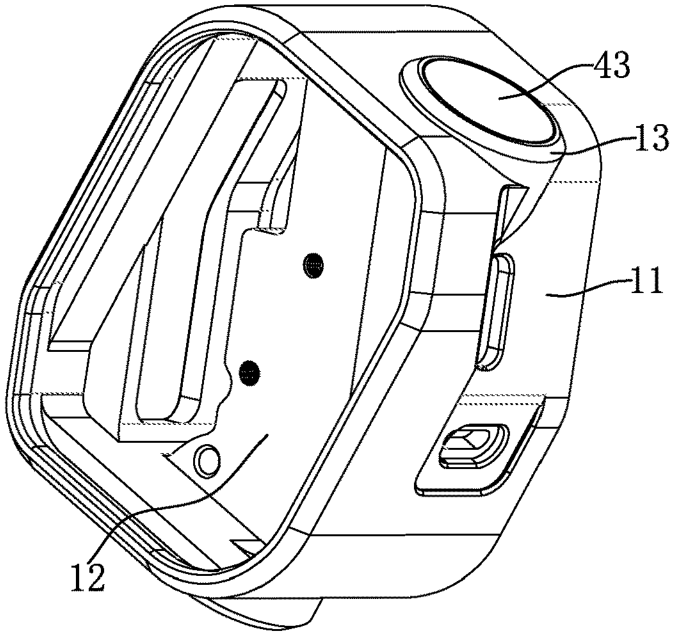
FIG. 7 is an isometric view of the portable magnetic lighting fixture in FIG. 2, the supporting base being removed.
Figure 8:
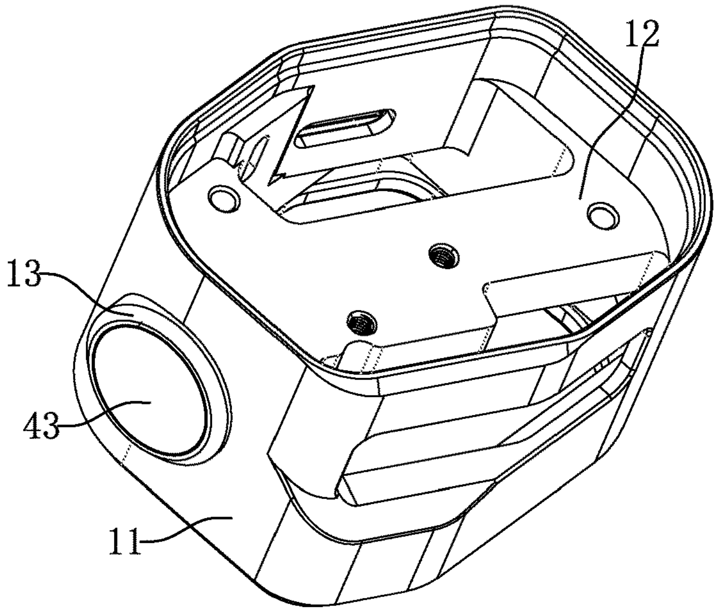
FIG. 8 is an isometric view of the portable magnetic lighting fixture in FIG. 7, viewed from another aspect.
Figure 9:
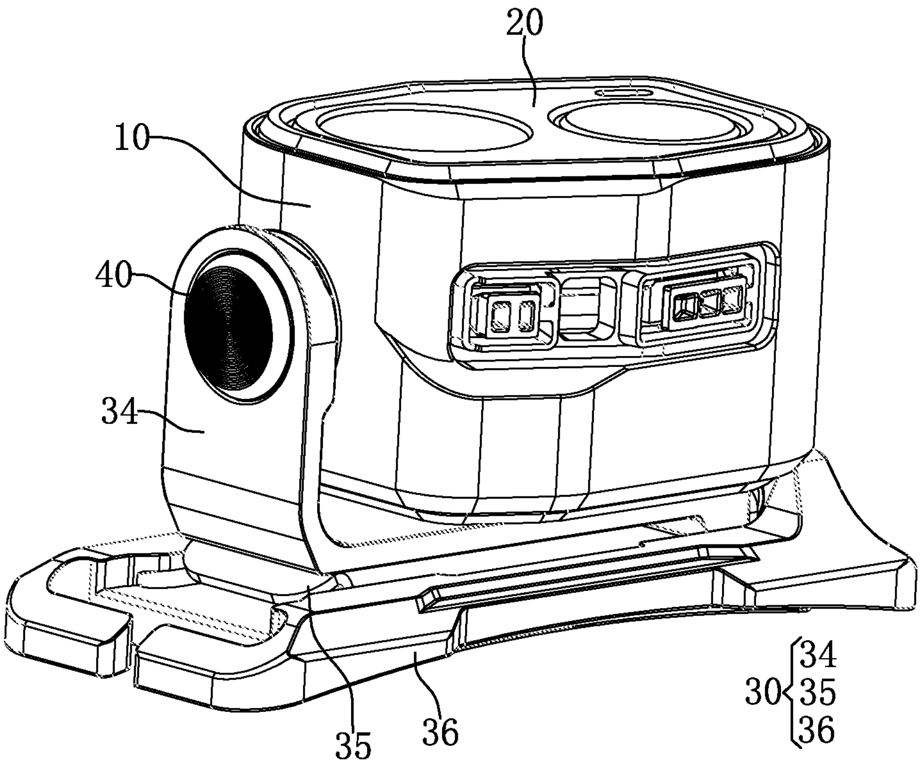
FIG. 9 is an isometric view of a carrier plate of the lower shell in FIG. 1, viewed from another aspect.
Figure 10:
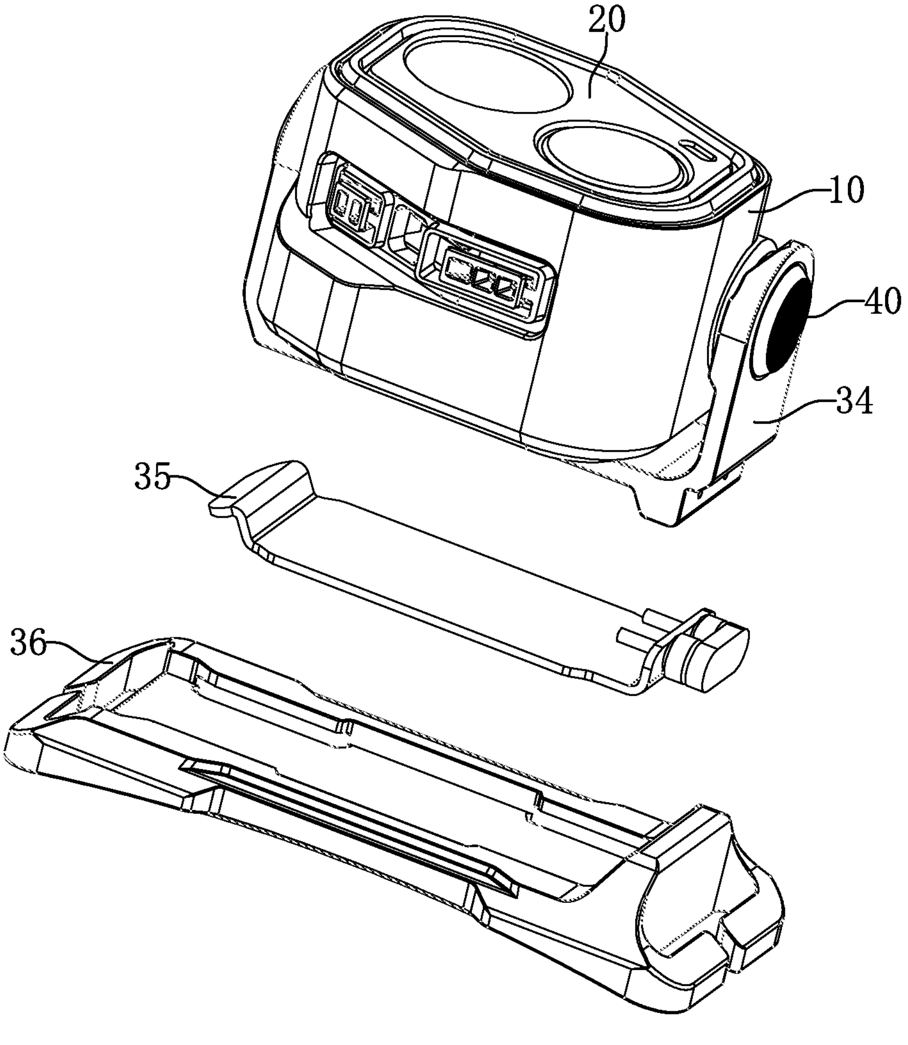
FIG. 10 is an isometric exploded view of the portable magnetic lighting fixture in FIG. 9.

Referring to FIGS. 1 to 10, a portable magnetic lighting fixture provided in the present disclosure. The device includes a housing 10, a lighting source component 20, a supporting base 30, and a magnetic adjustment component 40. The lighting source component 20 emits light and is installed on the housing 10. The magnetic adjustment component 40 includes a first magnetic element 41 and a second magnetic element 42. The second magnetic element 42 cooperates magnetically with the first magnetic element 41 for controlling the adjustment angle of the housing 10. The first magnetic element 41 is installed in the housing 10, and the second magnetic element 42 is installed on the supporting base 30. By using magnetic attraction between the first and second magnetic elements, the housing 10 may be rotated relative to the supporting base 30, allowing adjustment to any angle while maintaining stability. The housing is rotated and maintains in an proper position with respect to the supporting base by the magnetic adjustment assembly. The term proper position here means that the housing rotates on the supporting base according to user's wishes.

Additionally, the magnetic adjustment component 40 may magnetically attract external magnets or iron blocks, facilitating the device's fixation in different magnetic positions for versatile usage scenarios. The magnetic connection between the first and second magnetic elements allows for easy separation, enabling the disassembly of the housing 10 from the supporting base 30 for interchangeability with different supporting bases.

In one embodiment, as shown in FIGS. 3 to 7, an outer side of the housing 10 has a raised limiting ring 13, and the supporting base 30 has a limiting groove 301. The limiting ring is slightly protruding outward relative to the outer surface of the housing. The limiting groove 301 cooperates with the limiting ring 13 for preventing unintended separation of the housing 10 from the supporting base 30. Optionally, the limiting groove 301 may be circular, polygonal, or linear, restricting the movement of the limiting ring 13.

In another embodiment, as shown in FIGS. 2 to 7, the first magnetic element 41 is provided within the limiting ring 13, and the supporting base 30 has a receiving hole 302 on the bottom of the limiting groove 301. The second magnetic element 42 is received within the receiving hole 302. This configuration ensures proper positioning of the first magnetic element 41, maximizing the magnetic contact area between the first and second magnetic elements to prevent misalignment during the relative rotation of the housing 10 and supporting base 30.

Optionally, the receiving hole 302 may be connected to the bottom of the limiting groove 301, reducing the distance between the second magnetic element 42 and the first magnetic element 41, thereby increasing the magnetic force and enhancing the stability of the rotation of the housing 10.

The first magnetic element 41 has a ring-shaped, cylindrical, or polyhedral structure. Similarly, the second magnetic element 42 may have a similar structure to the first magnetic element 41, providing a larger magnetic contact area.

Optionally, an end surface of the first magnetic element 41 proximate the second magnetic element 42, and an end surface of the second magnetic element 42 proximate the first magnetic element 41 may be planar. This structure maintains a constant distance between the first magnetic element 41 and the second magnetic element 42 during relative movement of the housing 10 and the supporting base 30, thereby increasing stability and reducing noise during adjustment. In other embodiments, the end surface of the first magnetic element 41 near the second magnetic element 42 may also be conical or spherical to ensure stability and smoothness during adjustment.

In the embodiment, there are two limiting rings 13 on each side of the housing 10. The two limiting grooves 301 correspond to the two limiting rings 13, respectively. The configuration of the two limiting rings 13 and the two limiting grooves 301 results in the movement of the housing 10 in the axial direction, prevents the tilting of the housing 10, improves the stability of the two sides of the housing 10, and facilitates the reduction of the size of the first magnetic element 41 and the second magnetic element 42.

In the same embodiment, as shown in FIGS. 1 to 7, there are two magnetic adjustment components 40. Each positioned on opposite sides of the housing 10. Using two magnetic adjustment components 40 enhances stability on both sides of the housing 10 and ensures balanced magnetic distribution, contributing to increased stability of the housing 10. Optionally, the number of limiting rings 13, limiting grooves 301, and receiving holes 302 is two each, corresponding to the two first magnetic elements 41, two limiting rings 13, and two second magnetic elements 42, respectively. This arrangement improves the stability of the connection between the housing 10 and the supporting base 30 for preventing separation.

The magnetic adjustment component 40 includes a shim 43 provided between the first magnetic element 41 and the second magnetic element 42. The shim 43 frictionally engages with the second magnetic element 42. This frictional engagement hinders the movement of the housing 10 when it moves relative to the supporting base 30, maintaining stability in an angle of the housing 10 after external force removal.

Optionally, the shim 43 may be a friction pad, such as a sticker, attached near an end of the first magnetic element 41 near the second magnetic element 42 or fixed to the housing 10. The shim 43 may have a softer composition compared to the first magnetic element 41 and the second magnetic element 42 for reducing noise during adjustments.

In another embodiment, the shim 43 is positioned at one end of the second magnetic element 42 which is adjacent to the first magnetic element 41. The first magnetic element 41 engages with the shim 43, increasing friction during adjustment and enhancing stability in the angle between the housing 10 and the supporting base 30. In other embodiments, the shim 43 may engage with both the first and second magnetic elements 41 and 42 for increasing friction during relative movement.

In the present disclosure, the first magnetic element 41 is a magnet. Specifically, a strong magnet like neodymium magnet. This magnetic property allows mutual attraction between the first magnetic element 41 and the second magnetic element 42 to provide sufficient friction for stabilizing the rotation angle after external force removal. The second magnetic element 42 may be a ferrous block or magnet, enabling magnetic attraction with the first magnetic element 41. The rotation or sliding movement of the first magnetic element 41 relative to the second magnetic element 42 may be facilitated during the adjustment process, depending on the shape of their end surface, such as a circular, conical, or different sizes. Other embodiments may use a ferrous block as the first magnetic element 41 and a magnet, such as neodymium magnet, as the second magnetic element 42 for allowing mutual magnetic attraction.

The supporting base 30 comprises an articulated seat 34, a fixing frame 36 and a resilient member 35. The articulated seat 34 is connected to the second magnetic element 42, the fixing frame 36 is for external connecting components, and the resilient member 35 is designed to urge the fixing frame 36 and the articulated seat 34 to cooperatively clamp external positions to be clamped. The resilient member 35 is connected to the articulated seat 34 and the fixing frame 36.

Optionally, the resilient member 35 may be connected to the articulated seat 34 through methods like snap-fitting, screws, or magnetic attraction, making it suitable for use as a clip lamp for external structures. The fixing frame 36 may be connected to the resilient member 35 through snap-fitting, screws, or magnetic attraction, serving as a new accessory. This design allows compatibility with different usage environments, utilizing the fixing frame 36 for external connections while also clamping external positions.

The supporting base 30 further includes a first connecting plate 32 and two side plates 31 extending from the first connecting plate 32 so as to form the letter U-shaped supporting base 30. The two side plates 31 are positioned at the two ends of the first connecting plate 32, and the housing 10 located between them. The second magnetic element 42 is connected to the side plates 31. This simple and lightweight structure facilitates easy processing and assembly. Optionally, the limiting grooves 301 are opened on the side plates 31, limiting the sliding of the first magnetic element 41 and the second magnetic element 42 along the plane of the side plates 31. The supporting base 30 is made of metal, engineering plastics, or other materials.

Furthermore, two protrusions 312 are provided on each side plate 31 for forming a limiting groove 301 which is provided between the two protrusions 312. This design facilitates the insertion of the limiting rings 13 between the two protrusions 312 and sliding to the position corresponding to the second magnetic element 42, facilitating the assembly of the housing 10.

In the embodiment, a distance between the two side plates 31 gradually increases from one end near the first connecting plate 32 to the end away from the first connecting plate 32. This design assists in guiding the limiting rings 13 during the assembly of the housing 10. The end of the side plates 31 away from the first connecting plate 32 may be configured with an arcuate surface 311 to increase the distance between the two side plates 31 and reduce resistance during the assembly of the housing 10.

The supporting base 30 further includes a second connecting plate 33 for external connecting components. This facilitates the wearing or fixing of the portable magnetic lighting fixture. The second connecting plate 33 may be a flexible component, such as a plastic or silicone sheet so as to provide a certain cushioning effect for comfortable and stable contact with the forehead. In some embodiments, an independent detachable forehead pad is mounted on the headband or on the second connecting plate 33 for adjusting the angle of the lamp, offers a buffering function to user.

The side plates 31 have accommodating holes 302, and the second magnetic element 42 is installed in the accommodating holes 302. This facilitates the positioning of the installation location of the second magnetic element 42 and prevents it from sliding along the plane of the side plates 31.

Furthermore, the accommodating holes 302 pass through the side plates 31, and a limiting cap 44 are installed on the side plates 31 to cover the accommodating holes 302 away from the first magnetic element 41. This prevents the second magnetic element 42 from falling out of the accommodating holes 302 and adds a decorative effect, enhancing the aesthetic appeal of the supporting base 30. In other embodiments, the accommodating holes 302 may be blind holes to prevent the second magnetic element 42 from moving in the direction away from the first magnetic element 41.

In the present disclosure, the portable magnetic lighting fixture includes a circuit board 50, a power supply 51, and a control switch 52. The circuit board 50 is electrically connected to the light source component 20, the power supply 51 is electrically connected to the circuit board 50, and the control switch 52 is electrically connected to the circuit board 50. The circuit board 50 and the power supply 51 are installed inside the housing 10, while the control switch 52 is mounted on the housing 10. The power supply 51 may be a rechargeable battery, such as a lithium battery, providing a more environmentally friendly option.

The portable magnetic lighting fixture furthermore includes a wireless charging coil 53 installed on the housing 10, electrically connected to the circuit board 50. The wireless charging coil 53 facilitates wireless charging of the power supply 51. Optionally, the wireless charging coil 53 is located at one end of the housing 10 away from the light source component 20 for improving charging efficiency by reducing the distance between the wireless charging coil 53 and the external charging coil during external charging.

A charging port, such as a USB-C interface, is located on circuit board 50 for charging power source 51 by connecting to the output terminal of a charger through the charging port.

The housing 10 further has a third magnetic element 54 for magnetically attaching an external magnet and positioned around the wireless charging coil 53. The third magnetic element 54 is configured to secure the lamp head to an external magnet after it has been removed from the housing 10 and the supporting base 30, thereby facilitating hands-free operation in a variety of situations. Additionally, during wireless charging, the third magnetic element 54 maintains the relative stability of the wireless charging coil 53 and external charging coil positions.

In the embodiment, the first magnetic element 41, second magnetic element 42, and third magnetic element 54 are magnets. Through the action of magnetism, it is possible to attach the lamp head to a supporting base 30 capable of adjusting the angle or to a supporting base 30 for other functions, such as a headband, a clip, or a helmet mount, etc.

Optionally, multiple third magnetic elements 54, functioning as magnets, are arranged around the wireless charging coil 53 to enhance the stability of the housing 10 during wireless charging. These elements may be bar or ring-shaped magnets, facilitating alignment with external magnetic elements to position the wireless charging coil 53.

The housing 10 further includes an outer shell 11, a heat dissipation plate 12 inside the outer shell 11, and the light source assembly 20 and the circuit board 50 mounted on the heat dissipation plate 12. The heat dissipation plate 12 conducts heat generated by the light source assembly 20 and circuit board 50 to the outer side of the housing 10, enhancing the heat dissipation efficiency. Optionally, an integrated structure of the heat dissipation plate 12 and outer shell 11 improves structural stability and heat dissipation efficiency. The outer shell 11 is shaped like a bowl and has a bottom wall and a side wall extending from the bottom wall.

The power source 51 is located on one side of the circuit board 50 away from the light source assembly 20, and the wireless charging coil 53 and third magnetic attraction element 54 are also on the same side as the power source 51 for promoting better heat dissipation.

Optionally, an insulating pad 55 is installed between the circuit board 50 and the heat dissipation plate 12 for providing insulation to prevent short circuits. A gasket 56 is installed between the power source 51 and the circuit board 50 to ensure insulation, increase the distance between them, and maintain stability, preventing the heat from affecting the power source 51.

The housing 10 includes a cover 14 as the bottom, which seals a bottom of the outer shell 11 away from the light source assembly 20. The cover 14 may be detachably connected to the outer shell 11, facilitating processing and assembly of the housing 10.

The light source assembly 20 has a translucent board 23, a reflector 22, and a LED lamp board 21. The lamp board 21 is electrically connected to the circuit board 50, the translucent board 23 is mounted in the housing 10, the lamp board 21 is mounted on the heat dissipation plate 12, and the reflector 22 is installed between the translucent board 23 and the lamp board 21. This arrangement allows the heat dissipation plate 12 to dissipate heat from the lamp board 21 for improving its lifespan. The reflector 22 is used to emit light from the lamp board 21 for controlling the emission angle and illuminated area.

The lamp board 21 has one or more light beads, and the reflector 22 has multiple reflecting surfaces corresponding to each light source. This enables various emission effects, such as different beam angles and brightness, by using different light sources and reflecting surfaces. The lamp board 21 may provide one or more types of light sources, and the circuit board 50 may supporting various modes of control, such as continuous or discontinuous light modulation, different light source switching, flashing, and safety light lock.

The light board 21 may be provided with one or more light sources, and the circuit board 50 may be used with multiple or seamless bright and dark dimming, different light sources switches, flashing lights, safety shut-off lockout, and other multi-mode.

While the present disclosure has been described with reference to a specific embodiment, the description of the disclosure is illustrative and is not to be construed as limiting the disclosure. Various of modifications to the present disclosure may be made to the exemplary embodiment by those skilled in the art without departing from the true spirit and scope of the disclosure as defined by the appended claims.

What is claimed is:

1. A portable magnetic lighting fixture comprising:
- a housing;
- a light source assembly mounted on the housing for emitting light;
- a supporting base for supporting the housing with the light source assembly; and wherein
- a magnetic adjustment assembly, has a first magnetic element on the housing and a second magnetic element disposed on the supporting base, the first magnetic element magnetically cooperating with the second magnetic element for adjusting an angle of rotation of the housing with the light source assembly such that the light source assembly may be rotated relative to the supporting base;
- a limiting ring is provided on the outer side of the housing, and a limiting groove is provided on the supporting base for cooperating to the limiting ring thereby the limiting ring partially extends into the limiting groove.

2. The portable magnetic lighting fixture according to claim 1, wherein the first magnetic element is positioned inside the limiting ring, and the supporting base has a receiving hole communicating with the limiting groove for receiving the second magnetic element.

3. The portable magnetic lighting fixture according to claim 1, wherein the number of the limiting rings is two, the two limiting rings are located on opposite sides of the housing corresponding to two limiting grooves, respectively.

4. The portable magnetic lighting fixture according to claim 1, wherein the magnetic adjustment assembly further includes a shim provided between the first magnetic element and the second magnetic element for enhancing friction.

5. The portable magnetic lighting fixture according to claim 1, wherein the supporting base has an articulated seat connected to the second magnetic element, a fixing frame for external connection, and a resilient member for driving the fixing frame for cooperating with the articulated seat to clamp external units to be held, the resilient member connected to the articulated seat and the fixing frame.

6. The portable magnetic lighting fixture according to claim 1, wherein the portable magnetic lighting fixture includes a circuit board electrically connected to the light source assembly, a power source electrically connected to the circuit board, and a controlling switch electrically connected to the circuit board, the circuit board and the power source installed inside the housing, and the controlling switch installed on the housing.

7. The portable magnetic lighting fixture according to claim 6, wherein the portable magnetic lighting fixture further includes a wireless charging coil installed on the housing and electrically connected to the circuit board.

8. The portable magnetic lighting fixture according to claim 7, wherein the housing is internally equipped with a third magnetic element for magnetically attracting external magnets, and the third magnetic element is arranged around the wireless charging coil.

9. The portable magnetic lighting fixture according to claim 6, wherein the housing comprises an outer shell and a heat dissipation plate installed inside the outer shell, the light source assembly and the circuit board mounted on the heat dissipation plate.

10. A portable magnetic lighting fixture comprising:
- a housing having an outer shell with an opening;
- a light source assembly mounted on the outer shell for emitting light;
- a supporting base for supporting the housing, and wherein
- a magnetic adjustment assembly is provided on opposite sides of the housing and has a first magnetic element and a second magnetic element on the supporting base cooperating magnetically with the first magnetic element for adjusting an angle of rotation of the housing with light source assembly;
- limiting groove is provided on the supporting base for receiving the second magnetic element;
- a limiting ring is provided on both sides of the outer shell for receiving the first magnetic element, and the limiting ring is slightly protruding outward relative to the outer surface of the outer shell.

11. The portable magnetic lighting fixture according to claim 10, wherein the supporting base has a first connecting plate and two side plates extending from the first connecting plate, the housing with light source assembly is sandwiched between the two side plates of the supporting base.

12. The portable magnetic lighting fixture according to claim 11, wherein a receiving hole is provided on each side plate of the supporting base for receiving the second magnetic element, and two protrusions are provided on each side plate for forming the limiting groove provided between the two protrusions for receiving the limiting ring.

13. The portable magnetic lighting fixture according to claim 12, wherein the magnetic adjustment component further includes a shim provided between the first magnetic element and the second magnetic element.

14. The portable magnetic lighting fixture according to claim 1, wherein the supporting base has an articulated seat connected to the second magnetic element, a fixing frame, and a resilient member for driving the fixing frame for cooperating with the articulated seat to clamp external parts to be held, the resilient member connected to the articulated seat and the fixing frame.

* * * * *